United States Patent
Loeffler et al.

(10) Patent No.: US 10,953,766 B2
(45) Date of Patent: Mar. 23, 2021

(54) METHOD AND APPARATUS FOR DETERMINING AND PROVIDING INFORMATION ABOUT ELECTRICITY USAGE OF AN ELECTRIC VEHICLE

(71) Applicant: Ford Global Technologies, LLC, Dearborn, MI (US)

(72) Inventors: Michael Peter Loeffler, Bergisch Gladbach (DE); Frank Peters, Frechen (DE); Thomas Birkenbeil, Hennef (DE); Guido Feuser, Bonn (DE); Frank Mast, Mannheim (DE); Yiyi Xiang, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 16/389,684

(22) Filed: Apr. 19, 2019

(65) Prior Publication Data
US 2019/0322191 A1   Oct. 24, 2019

(30) Foreign Application Priority Data
Apr. 20, 2018 (DE) .......................... 102018206145.9

(51) Int. Cl.
*B60L 53/66* (2019.01)
*G06Q 30/02* (2012.01)
*B60L 53/64* (2019.01)

(52) U.S. Cl.
CPC ............ *B60L 53/665* (2019.02); *B60L 53/64* (2019.02); *G06Q 30/0202* (2013.01); *G06Q 30/0283* (2013.01)

(58) Field of Classification Search
CPC .... B60L 53/665; B60L 53/64; B60L 2260/54; B60L 2260/50; Y02T 90/14; Y02T 10/72; Y04S 30/14; Y04S 10/126; G06Q 30/0283; G06Q 20/145
See application file for complete search history.

(56) References Cited

U.S. PATENT DOCUMENTS

| | | | |
|---|---|---|---|
| 8,928,474 B2 | 1/2015 | Satake et al. | |
| 9,148,027 B2 | 9/2015 | Shane et al. | |
| 2010/0102776 A1* | 4/2010 | Uchida | B60L 53/65 320/109 |
| 2011/0276448 A1 | 11/2011 | Perper et al. | |
| 2013/0162451 A2 | 6/2013 | Pikolon | |

(Continued)

*Primary Examiner* — Kenneth J Malkowski
(74) *Attorney, Agent, or Firm* — Brandon Hicks; Eversheds Sutherland (US) LLP

(57) ABSTRACT

This disclosure describes systems, methods, and devices related to electricity usage. A device may determine the electric or a hybrid-electric motor vehicle is charged at one or more charging locations. The device may determine a cost associated with electricity applicable at the time of the charging at the one or more charging locations. The device may determine a billing period associated with the electricity cost, wherein the billing period is at least one month. The device may cause the prediction of electricity costs expected to arise by an end of a current billing period as a result of charging the vehicle at the one or more charging locations. The device may display, on a user display device, information associated with the prediction of electricity costs.

20 Claims, 4 Drawing Sheets

(56) References Cited

U.S. PATENT DOCUMENTS

| | | | |
|---|---|---|---|
| 2014/0028254 A1* | 1/2014 | Shane | B60L 53/665 |
| | | | 320/109 |
| 2014/0214459 A1* | 7/2014 | Ryder | B60L 53/63 |
| | | | 705/5 |
| 2016/0292999 A1* | 10/2016 | Watts-Fitzgerald | ............ |
| | | | G08G 1/0129 |
| 2020/0226697 A1* | 7/2020 | Han | G06Q 30/0283 |

* cited by examiner

METHOD AND APPARATUS FOR DETERMINING AND PROVIDING INFORMATION ABOUT ELECTRICITY USAGE OF AN ELECTRIC VEHICLE

CROSS-REFERENCE TO RELATED APPLICATION(S)

This application claims the benefit of German Application No. 102018206145.9, filed Apr. 20, 2018, the disclosure of which is incorporated herein by reference as if set forth in full.

TECHNICAL FIELD

This disclosure generally relates to method and apparatus for determining and providing information about electricity usage of an electric vehicle.

BACKGROUND

Electric vehicles require recharging at a charging station. Further, continuous electricity costs for electric driving are displayed on the basis of the battery current used. Therefore, different kilowatt prices for the charging are taken into account. There is a need for better tracking of electric usage by electric vehicles.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Continuous electricity costs for electric driving are displayed on the basis of the battery current used, and potentially different kilowatt prices for the charging are taken into account. It is proposed that mean costs of the electric current currently being charged and the like are also calculated and displayed if desired. Charging management systems for charging electric vehicles May predict the future usage of the vehicles on the basis of profile usage data in order to optimize the usage of charging station resources. Further, a device into which the current fuel price can be entered when refueling with fossil fuel, and from which the amount that has been paid for fuel during, for example, the last 12 months, can later be displayed. Also, a billing system for electric or hybrid-electric vehicles which shifts the costs for charging electric current that is not drawn from a domestic electrical connection over to the domestic electricity bill.

However, none the solutions determine and provide information about the electricity costs of an electric vehicle.

Example embodiments of the present disclosure relate to systems, methods, and devices for determining and providing information about the electricity costs of an electric vehicle In one or more embodiments, an electricity usage system may determine and provide information about the usage and costs of electric power with which a particular electric or hybrid-electric motor vehicle is charged at charging locations, taking into account the electricity price applicable at the time, as well as a motor vehicle configured for carrying out the method according to the preambles of the independent patent claims.

In one or more embodiments, an electricity usage system may be based on the object of permitting better cost control to the users of electrical mobility.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Figure 1:
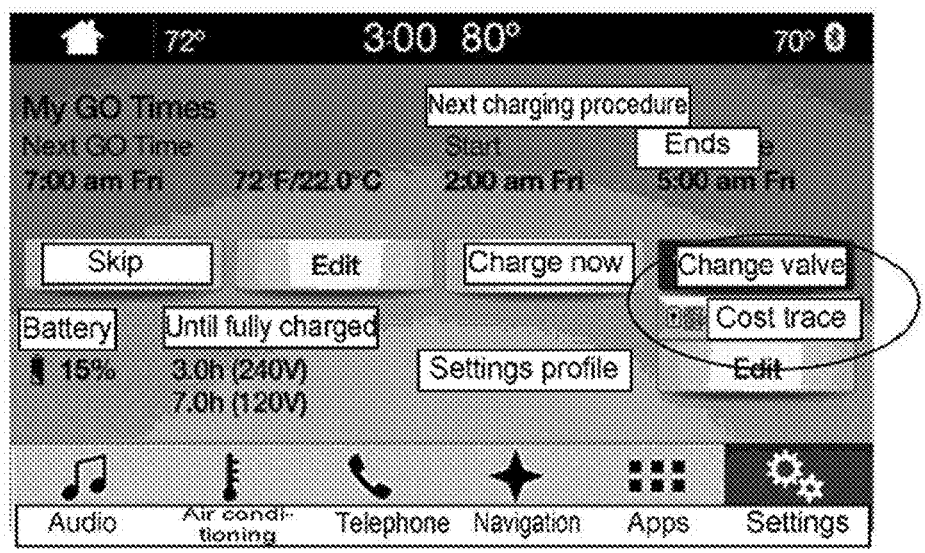
FIGS. 1-2 depict illustrative schematic diagrams for an electricity usage system menu, in accordance with one or more example embodiments of the present disclosure.
Figure 2:
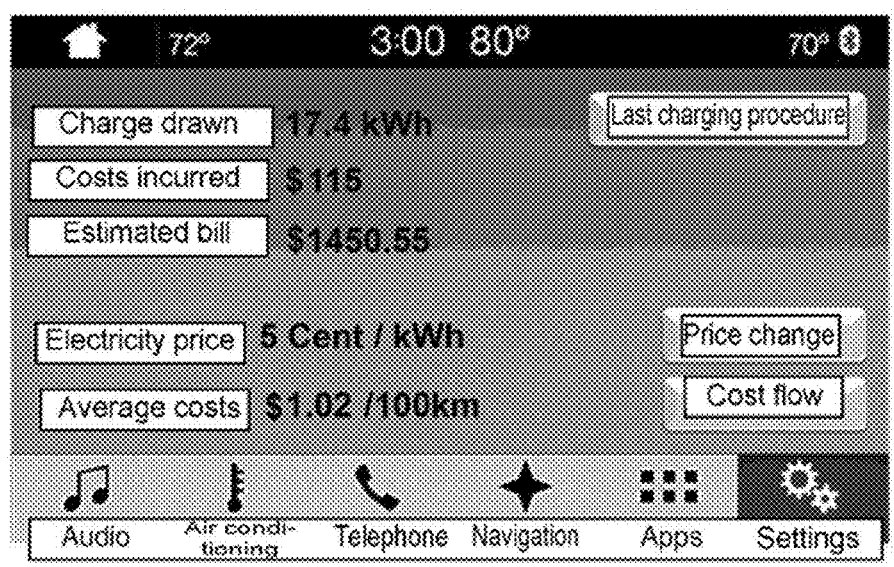

FIGS. 1-2 depict illustrative schematic diagrams for an electricity usage system menu, in accordance with one or more example embodiments of the present disclosure.

In one or more embodiments, the electricity costs arising for the charging of the vehicle at a charging location over a billing period of at least one or a plurality of months are captured separately. A prediction for the electricity costs that can be expected to arise by the end of the current billing period as a result of charging the vehicle at this charging location is prepared from the corresponding data. Information about the electricity costs predicted in such a way in the current billing period is made available to a user of the vehicle.

It should be understood that the majority of users of electric vehicles or hybrid vehicles, such as, for example, so-called plug-in hybrid vehicles, prefer to charge their vehicle at home. The electricity bill for this is normally a cycle that is calculated on a monthly basis, quarterly basis, yearly basis, etc. This leads, particularly in the month (or other cycles) following the acquisition of an electric or hybrid vehicle, to an enormous increase in the domestic electricity costs. These additional costs are often not budgeted for by the user, or are difficult to calculate. Through a prediction of the additional costs for the charging at home, the user can budget for this, and is not unpleasantly surprised and potentially disappointed by his vehicle at a later date.

In one or more embodiments, the charging location with a billing period of one or more months is frequently a domestic electricity connection in or at a home of the user. This can, for example, be a conventional mains electricity connection in the form of a domestic socket, or, for example, may also be a domestic wall charging station fed by three-phase current in a garage or the like.

In one or more embodiments, an electricity usage system may be advantageously suitable for other charging locations or charging stations, for example at a parking place close to a workplace of the user, in those cases in which the current drawn there is later cumulatively billed to the user.

The billing period of private electricity connections is one more months but in other applications, the billing period may be up to a year. In some scenarios, the billing period may be a half or quarter year, or even shorter.

In one or more embodiments, an electricity usage system may facilitate predicting the electricity costs for the home-charging or the like much more accurately than would even be possible for a user who waits for the end of the cycle.

In particular, the electricity costs may be predicted taking into account a stored profile of earlier charging procedures at the charging location with a billing period of at least one month, as well as taking into account a stored profile of earlier journeys with the vehicle. For example, a user of an electric vehicle may create a profile use an interface (e.g., on a mobile phone or on the electric vehicle). The profile may access a historical database that contain information associated with earlier charging procedures, such as frequency of the charging, the length of time of charging, or the like during a predetermined period (e.g., a day, a month, or a user specified period). In addition, the profile may also maintain information associated with trips using the electric vehicle. For example, the profile may access a historical database that contain information associated with trips taken during a predetermined period (e.g., a day, a month, or a user specified period).

In one or more embodiments, an electricity usage system may facilitate that charging procedures and journeys that are not so far back in the past can be given a greater weighting than charging procedures and journeys that lie further back in time. Changes in the traveling habits of the user can be taken into account in this way. For example, a historical database may contain information associated with all the charging instances (or procedures) and journeys of the electric vehicle for a specific period of time, which can be a user defined period or a system administrator defied period. During that period, a weight factors may be applied to each of the charging instances (or procedures) and journeys of the electric vehicle, such that, the weight factors are larger with respect to more recent charging instances or procedures. For example, if the specific period of time where charging instances (or procedures) and journeys are captured is 12 months, the charging instances (or procedures) and journeys during the first month, may be multiplied by a weight factor that is less than a weight factor associated with the second month and so on, such that the most recent month's charging instances (or procedures) and journeys would be weighed with the highest weight factor. In this example, the weight factors were based on a monthly basis, however, the weight factors may be based on an hourly basis, a daily basis, a charging instance or journey basis, or on any basis determined by the user or an administrator of the system.

In one or more embodiments, the calculation of the predicted electricity costs in the current billing period can be based on a price per kilowatt-hour entered by the user or—in particular when the electricity costs vary with time or with demand—on an input by the electricity supplier and a tariff type. Further factors can also be considered in the electricity cost prediction, for example, the electricity costs that arose in the previous billing period for the home charging, if corresponding data is present.

In one or more embodiments, the predicted current costs in the current billing period can be made available via a user interface when requested by the user. Alternatively, or in addition, the predicted current costs in the current billing period can be provided, without a request from the user, in order to inform him in good time if, for example, the annual current costs are expected to exceed a specified limit.

In one or more embodiments, the user interface can be a user screen, for example on a display of a vehicle infotainment system, or of a mobile terminal such as, for example, a smartphone. Alternatively or in addition there may be a speech interface that interprets received voice input and states the predicted electricity costs when, for example, the user asks the device: "What is my electricity bill likely to be like?".

A description of exemplary embodiments on the basis of the drawings follows.

Referring to FIG. 1, there is shown a menu of a user screen of an infotainment system in an electric or hybrid vehicle.

Referring to FIG. 2, there is shown a submenu of the menu of FIG. 1.

In a main menu, not shown, of a user screen of an infotainment system that is set, in the exemplary embodiment, to the English language, in an electric or hybrid vehicle, there is a menu item for "settings" through which a submenu is reached that contains a button which, when selected, leads to the menu for electric drive settings shown in FIG. 1.

In addition to further buttons and a variety of information that is not relevant to the present case, and therefore not described in more detail, the menu of FIG. 1 contains a "Cost trace" button, marked by an ellipse, which, when selected, leads to the menu shown in FIG. 2, giving an overview of the topic of cost tracing.

In particular, the menu of FIG. 2 contains information about the charge most recently drawn (17.4 kWh), about the costs that have arisen in the current billing period as a result of home charging ($115), and about the total costs to be expected in the current charging period for the home charging ("Estimated bill", which in this example is $1450.55).

An average electricity price at the domestic electricity connection (5 cent/kWh), which the user has entered after selecting a "Change price" button, and the average costs for electric driving ($1.02/100 km) are also displayed.

A "Cost flow" button leads to a bar diagram, not shown, of previous energy consumptions or costs in, for example, recent months.

If the vehicle is not only charged at home, but also, for example, at public charging stations, the system must, of course, be able to detect where it is being charged at the time. This can, for example, be done on the basis of data provided by the charging station or, for example, on the basis of GPS data.

If the vehicle is charged at different charging locations, a menu such as that of FIG. 2 can also be differently configured or can contain further submenus, so that the user can also see energy consumptions and costs totaled and/or broken down into proportions.

Figure 3:
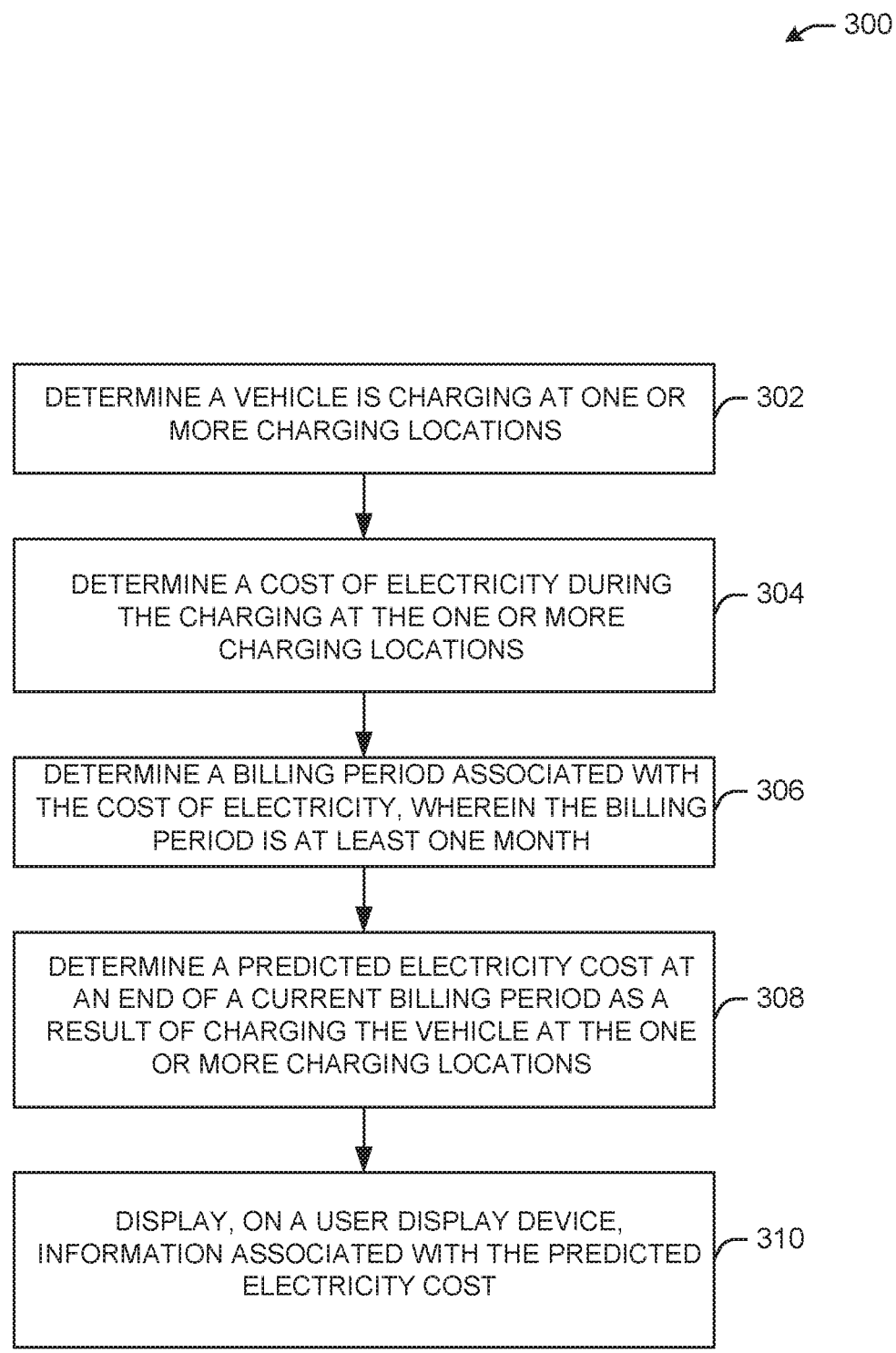
FIG. 3 illustrates a flow diagram of a process for an electricity usage system, in accordance with one or more example embodiments of the present disclosure.

FIG. 3 illustrates a flow diagram of illustrative process 300 for an illustrative electricity usage system, in accordance with one or more example embodiments of the present disclosure.

At block 302, the electricity usage system may determine a vehicle is charging at one or more charging locations.

At block 304, the electricity usage system may determine a cost of electricity during the charging at the one or more charging locations.

At block 306, the electricity usage system may determine a billing period associated with the cost of electricity, wherein the billing period is at least one month.

At block 308, the electricity usage system may determine a predicted electricity cost at an end of a current billing period as a result of charging the vehicle at the one or more charging locations.

At block 310, the electricity usage system may display, on a user display device, information associated with the predicted electricity cost.

It is understood that the above descriptions are for purposes of illustration and are not meant to be limiting.

Figure 4:
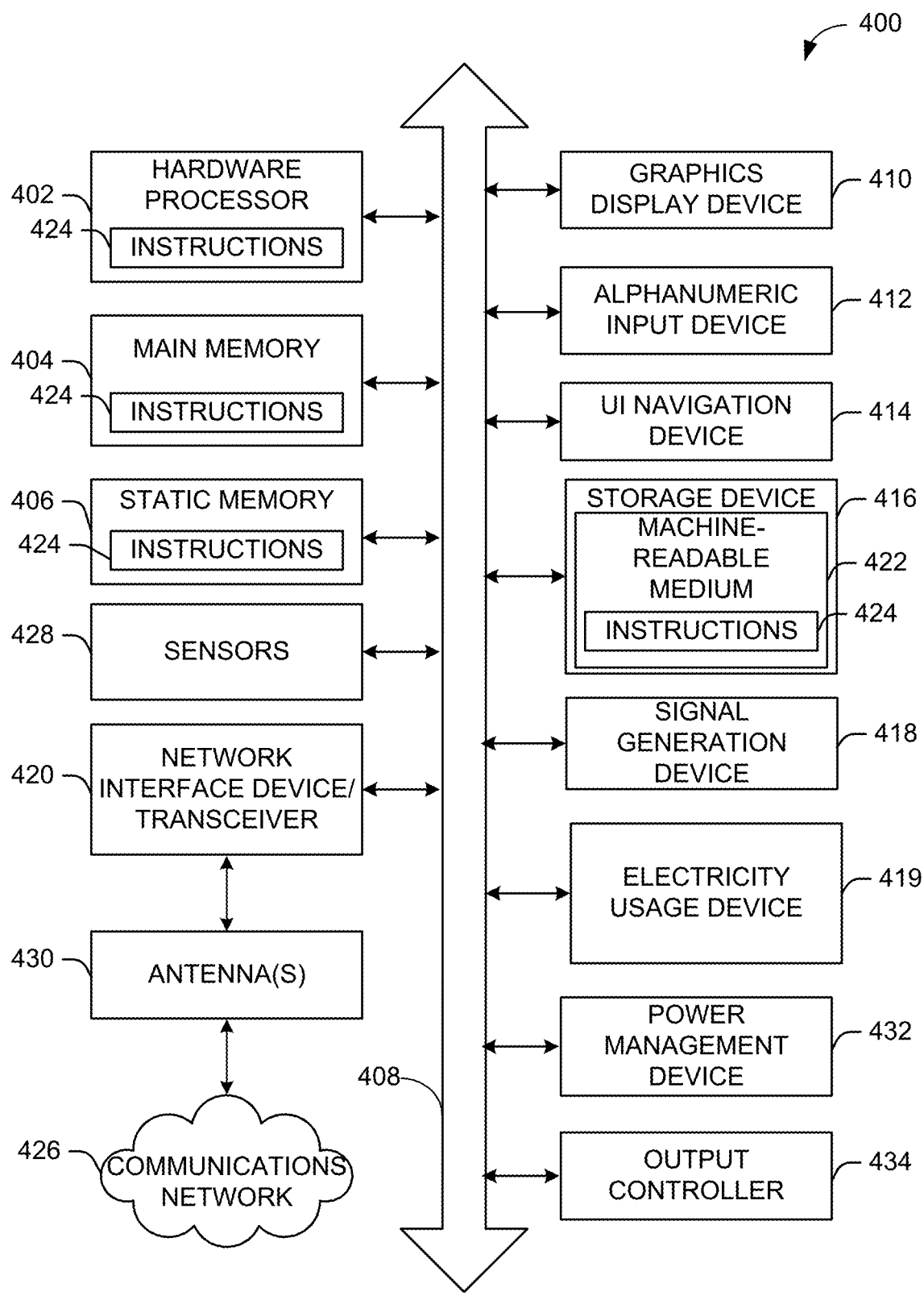
FIG. 4 depicts a block diagram of an example machine upon which any of one or more techniques (e.g., methods) may be performed, in accordance with one or more example embodiments of the present disclosure.

FIG. 4 illustrates a block diagram of an example of a machine 400 or system upon which any one or more of the techniques (e.g., methodologies) discussed herein may be performed. In other embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environments. The machine 400 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a power management device 432, a graphics display device 410, an alphanumeric input device 412 (e.g., a keyboard), and a user interface (UI) navigation device 414 (e.g., a mouse). In an example, the graphics display device 410, alphanumeric input device 412, and UI navigation device 414 may be a touch screen display. The machine 400 may additionally include a storage device (i.e., drive unit) 416, a signal generation device 418 (e.g., a speaker), an electricity usage device 419, a network interface device/transceiver 420 coupled to antenna(s) 430, and one or more sensors 428, such as a global positioning system (GPS) sensor, a compass, an accelerometer, or other sensor. The machine 400 may include an output controller 434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 402 for generation and processing of the baseband signals and for controlling operations of the main memory 404, the storage device 416, and/or the electricity usage device 419. The baseband processor may be provided on a single radio card, a single chip, or an integrated circuit (IC).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 416 may constitute machine-readable media.

The electricity usage device 419 may carry out or perform any of the operations and processes (e.g., process 500) described and shown above.

It is understood that the above are only a subset of what the electricity usage device 419 may be configured to perform and that other functions included throughout this disclosure may also be performed by the electricity usage device 419.

While the machine-readable medium 422 is illustrated as a single medium, the term "machine-readable medium" may include a single medium or multiple media (e.g., a centralized or distributed database, and/or associated caches and servers) configured to store the one or more instructions 424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device/transceiver 420 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 420 may include one or more physical jacks (e.g., Ethernet, coaxial, or phone jacks) or one or more antennas to connect to the communications network 426. In an example, the network interface device/transceiver 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device comprising:
at least one memory that stores computer-executable instructions; and
at least one processor configured to access the at least one memory, wherein the at least one processor is configured to execute the computer-executable instructions to:
determine a stored profile of earlier charging procedures for a vehicle at one or more charging locations;
determine a cost of electricity used to charge the vehicle during the earlier charging procedures at the one or more charging locations;
determine a billing period associated with the cost of electricity for the vehicle, wherein the billing period is at least one month;
determine a predicted total charging cost for the vehicle for a current billing period, the total charging cost for the vehicle for the current billing period including the cost of electricity used to charge the vehicle during the earlier charging procedures and a predicted charging cost to charge the vehicle during one or more future charging procedures within the current billing period, wherein the total charging cost for the vehicle is also based on a stored profile of earlier journeys using the vehicle; and display, on a user display device, information associated with the predicted total charging cost for the current billing period.

2. The device of claim 1, wherein the one or more charging locations include a domestic electricity connection at a home of a user.

3. The device of claim 1, wherein the billing period is one year, a half year, or a quarter year.

4. The device of claim 1, wherein the one or more charging locations includes a plurality of charging locations.

5. The device of claim 4, wherein the earlier charging procedures and earlier journeys are given a greater weighting based on when they occurred in time.

6. The device of claim 1, wherein the vehicle is an electric or a hybrid electric vehicle.

7. The device of claim 6, wherein the user interface is a user screen or a speech interface.

8. A non-transitory computer-readable medium storing computer-executable instructions which when executed by one or more processors result in performing operations comprising:

determining a stored profile of earlier charging procedures for a vehicle at one or more charging locations;

determining a cost of electricity used to charge the vehicle during the earlier charging procedures at the one or more charging locations;

determining a billing period associated with the cost of electricity for the vehicle, wherein the billing period is at least one month;

determine a predicted total charging cost for the vehicle for a current billing period, the total charging cost for the vehicle for the current billing period including the cost of electricity used to charge the vehicle during the earlier charging procedures and a predicted charging cost to charge the vehicle during one or more future charging procedures within the current billing period, wherein the total charging cost for the vehicle is also based on a stored profile of earlier journeys using the vehicle; and displaying, on a user display device, information associated with the total charging cost.

9. The non-transitory computer-readable medium of claim 8, wherein the one or more charging locations include a domestic electricity connection at a home of a user.

10. The non-transitory computer-readable medium of claim 8, wherein the billing period is one year, a half year, a quarter year, or a month.

11. The non-transitory computer-readable medium of claim 8, wherein the one or more charging locations includes a plurality of charging locations.

12. The non-transitory computer-readable medium of claim 11, wherein the earlier charging procedures and earlier journeys are given a greater weighting based on when they occurred in time.

13. The non-transitory computer-readable medium of claim 8, wherein the vehicle is an electric or a hybrid electric vehicle.

14. The non-transitory computer-readable medium of claim 13, wherein the user interface is a user screen or a speech interface.

15. A method comprising:

determining a stored profile of earlier charging procedures for a vehicle at one or more charging locations;

determining a cost of electricity used to charge the vehicle during the earlier charging procedures at the one or more charging locations;

determining a billing period associated with the cost of electricity for the vehicle, wherein the billing period is at least one month;

determine a predicted total charging cost for the vehicle for at an end of a current billing period, the total charging cost for the vehicle for the current billing period including the cost of electricity used to charge the vehicle during the earlier charging procedures and a predicted charging cost to charge the vehicle during one or more future charging procedures within the current billing period, wherein the total charging cost for the vehicle is also based on a stored profile of earlier journeys using the vehicle; and displaying, on a user display device, information associated with the predicted total charging cost.

16. The method of claim 15, wherein the one or more charging locations include a domestic electricity connection at a home of a user.

17. The method of claim 15, wherein the billing period is one year, a half year, a quarter year, or a month.

18. The method of claim 15, wherein the one or more charging locations includes a plurality of charging locations.

19. The method of claim 18, wherein the earlier charging procedures and earlier journeys are given a greater weighting based on when they occurred in time.

20. The method of claim 15, wherein the vehicle is an electric or a hybrid electric vehicle.

* * * * *